United States Patent
Nakamoto et al.

(10) Patent No.: US 8,312,178 B2
(45) Date of Patent: Nov. 13, 2012

(54) FIELD COMMUNICATION MANAGEMENT APPARATUS

(75) Inventors: Yasuyuki Nakamoto, Musashino (JP);
Hideki Umemoto, Musashino (JP);
Toshiyuki Emori, Musashino (JP);
Hiroshi Mori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/037,862

(22) Filed: Mar. 1, 2011

(65) Prior Publication Data

US 2011/0213900 A1 Sep. 1, 2011

(30) Foreign Application Priority Data

Mar. 1, 2010 (JP) ................................. 2010-043948
Aug. 20, 2010 (JP) ................................. 2010-185041

(51) Int. Cl.
*G06F 3/00* (2006.01)
*H04W 74/00* (2009.01)

(52) U.S. Cl. .......................................... 710/8; 455/410

(58) Field of Classification Search ....... 710/8; 455/410
See application file for complete search history.

(56) References Cited

U.S. PATENT DOCUMENTS

| | | | | |
|---|---|---|---|---|
| 7,800,771 B2* | 9/2010 | Koike et al. | .................. | 358/1.15 |
| 2008/0294915 A1* | 11/2008 | Juillerat et al. | ................ | 713/300 |
| 2009/0054033 A1* | 2/2009 | Pratt et al. | ..................... | 455/410 |

FOREIGN PATENT DOCUMENTS

JP 2002-007166 A 1/2002

OTHER PUBLICATIONS

ISA1000.11a, Realease 1, Oct. 2007, ISA.*

* cited by examiner

*Primary Examiner* — Hyun Nam
(74) *Attorney, Agent, or Firm* — Westerman, Hattori, Daniels & Adrian, LLP

(57) ABSTRACT

There is provided a field communication management apparatus capable of setting configuration information segments with certainty without causing a burden, and an inexpedience at the time of an operation for setting. A reception unit receives download information. A setting unit sets individual information segments contained in download information received by the reception unit in a corresponding field device and a gateway itself. A communication limiting unit prohibits communication between the field device and host devices for a period before the individual information segments are set in the field device and the gateway itself, respectively, by the setting unit.

8 Claims, 4 Drawing Sheets

FIELD COMMUNICATION MANAGEMENT APPARATUS

FIELD COMMUNICATION MANAGEMENT APPARATUS

This application claims priority from Japanese Patent Applications No. 2010-043948, filed on Mar. 1, 2010, and No. 2010-185041, filed on Aug. 20, 2010, the entire contents of which are herein incorporated by reference.

BACKGROUND

1. Technical Field

The present invention relates to a field communications managing apparatus for handling information necessary for communication between a field device and a communication device, the information being a pair of information segments to be set in the field device and the communication.

2. Related Art

In an ISA100.11a conforming to a field wireless standard, there is defined a Publish/Subscribe system as a system for sending and receiving data of a wireless field device, wherein a measured value is sent from a field device to a GW (gateway) via a BBR (Back Bone Router) or an operation value set by an upper device is sent from the GW to the field device via the BBR. In order to use this system, both data sending side (Publisher) and data receiving side (Subscriber) are required to preset configuration information segments including information specifying other party of communication beforehand, and complete the setting of the configuration information segments before communication starts.

A pair of configuration information segments to be set in the transmission side and the reception side are generally prepared in accordance with information specified by a process engineer by use of a software, which is generally referred to as a configuration tool. The thus prepared pair of configuration information segments are set in the GW and the wireless field device, respectively, by a download function of the configuration tool.

[Related Art Literature]
Patent Document 1 2002-007166A

The configuration information segments to be set in the GW and the wireless field device, respectively, represent the pair of information segments, and it is not possible to obtain normal communication operations in a state where only either one of the configuration information segments is set. In the case of using the configuration tool, it is generally inevitable to set either one of the configuration information segments at first, and to subsequently set the other thereof, so that there is a risk that a state of incomplete setting occurs in theory, thereby causing occurrence of an inexpedience. For this reason, an operation is conceivable whereby the setting of a pair of the information segments are completed in advance before the wireless field device is connected to a wireless environment. However, there can be the case where the configuration information segments are frequently altered, and it is impractical to cut the wireless field device off from connection with the wireless environment every time the configuration information segments are altered, so that such an operation is difficult to perform.

Further, in the case of using the related-art configuration tool, there also exists a risk of forgetting about the setting of either of the configuration information segments.

SUMMARY OF THE INVENTION

Exemplary embodiments of the present invention address the above disadvantages and other disadvantages not described above.

It is one of illustrative aspects of the present invention to provide a field communication management apparatus capable of setting configuration information segments with certainty without causing a burden, and an inexpedience at the time of an operation for setting.

According to one or more illustrative aspects of the invention, there is provided the field communications managing apparatus for handling information necessary for communication between a field device and a communication device, the information being a pair of information segments to be set in the field device and the communication device, respectively, said field communications managing apparatus comprising a setting unit for setting individual information segments of the pair of the information segments, in the field device and the communication device, respectively, and a communication limiting unit for limiting communications by the field device for a period before the individual information segments are set in the field device and the communication device, respectively, by the setting unit.

DETAILED DESCRIPTION OF EXEMPLARY EMBODIMENTS

Figure 1:
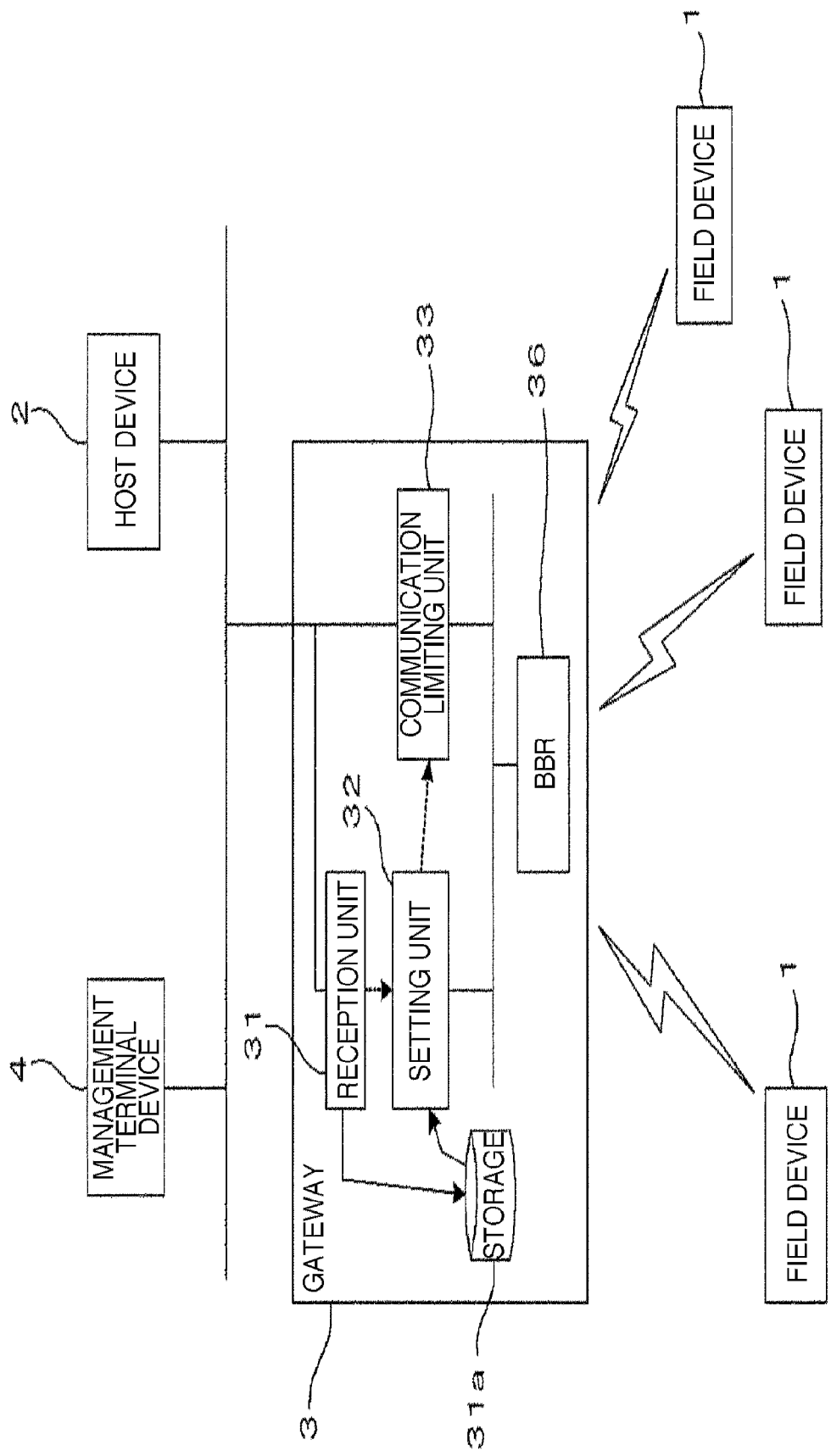
FIG. 1 is a block diagram showing a structure of a field communication management apparatus according to an embodiment 1.

FIG. 1 is a block diagram showing a structure of a field communication management apparatus according to an example 1.

As shown in FIG. 1, field devices 1, 1, . . . provided with a wireless communication function are disposed in a plant, and these field devices are connected to a host device 2 via a gateway 3. A measured value obtained by the field device 1 is transmitted, for example, from the field device 1 to the host device 2 via the gateway 3, and an operation value is transmitted from the host device 2 to the field device 1. At a point in time, the field device 1 and the gateway 3 implement wireless communication with use of a Publish/Subscribe system in accordance with the ISA100.11a conforming to a field wireless standard. As shown in FIG. 1, a BBR (Back Bone Router) 36 for implementing the wireless communication between the gateway 3 serving as "Gateway" and the field device 1 serving as "Device" is provided in the gateway 3.

Configuration information segments necessary for wireless communication is preset in the field device 1 and the gateway 3, respectively. The configuration information segments contain ID of a field device as the other party of communication, a password set in the field device, information for specifying the contents of communication, and a communication cycle. The configuration information segments preset in the field device 1 and the gateway 3, respectively, are treated as a pair of information segments, the field device 1, and the gateway 3 being in communication with each other.

The configuration information segments to be set in the field device 1 and the gateway 3 are prepared by a process engineer by use of a configuration tool mounted in a management terminal device 4 shown in FIG. 1. The process engineer prepares configuration information segment to be set in the field device 1 and configuration information segment to be set in the gateway 3, respectively, thereafter prepares download information formed by bundling these configuration information segments as a pair of information segments. The download information is downloaded into the gateway 3, described later.

As shown in FIG. 1, the gateway 3 comprises a reception unit 31 for receiving download information, a setting unit 32 for setting configuration information segments contained in the download information received by the reception unit 31, in a corresponding field device 1, and the gateway 3 itself, respectively, and a communication limiting unit 33 for prohibiting communication between the field device 1 and the host device for a period before the configuration information segments are set in the field device 1 and the gateway 3 itself, respectively, by the setting unit 32.

Figure 2:
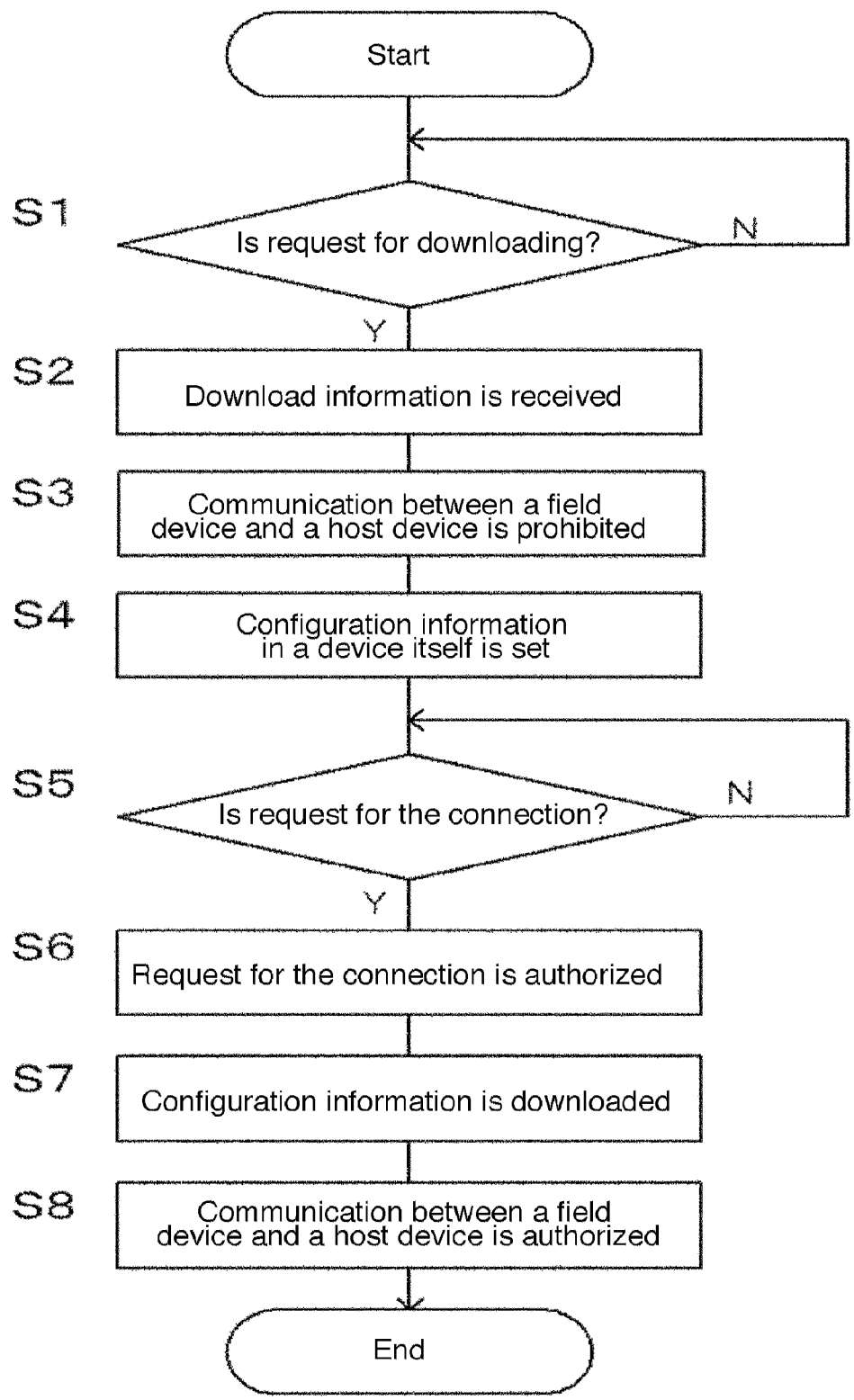
FIG. 2 is a flow chart showing an operation of a gateway when configuration information segments are set.

FIG. 2 is a flow chart showing an operation of the gateway when configuration information segments are set.

In step S1 in FIG. 2, it is decided as to whether or not a request for downloading from the management terminal device 4 is made, and an operation waits for affirmation of decision, and the operation proceeds to step S2 upon obtaining the affirmation.

In step S2, the reception unit 31 receives downloading of download information and stores the download information in a storage 31a. The download information contains the configuration information segments to be set in the field device 1 and the gateway 3 as targets for setting the configuration information.

Then, in step S3, the communication limiting unit 33 prohibits access of data from host devices including the host device 2 to the field device 1 as a target for setting the configuration information.

Next, in step S4, the setting unit 32 acquires the configuration information segment to be set in the gateway 3 from the download information stored in the storage 31a, and then sets the configuration information segment in the gateway 3.

Then, in step S5, the operation waits for confirmation on whether or not the field device 1 as a target for setting the configuration information has made a request for connection with a wireless environment, proceeding to step S6 upon obtaining the confirmation. In step S6, the request for the connection, made by the field device 1, is authorized.

Next in step S7, the setting unit 32 acquires configuration information segment to be set in the field device 1 from the download information stored in the storage 31a, and downloads the configuration information segment into the field device 1 via wireless communication. Upon completion of downloading, if the setting of the configuration information segment to the field device 1 is confirmed, the operation proceeds to a step S8.

In step S8, a state of prohibition of communication by the communication limiting unit 33 is released, and access of data from host devices including the host device 2 to the field device 1 is authorized. As a result, the field device 1 starts to execute data transmission/reception between itself and the host device via the gateway 3.

Further, if the field device 1 has not made the request for connection with the wireless environment as yet, the operation reverts to processing as executed in steps S6 to S8 at a point in time when the request for the connection is made.

The operation procedure shown in FIG. 2 is applied to all situations which require the setting and changing of the configuration information segments including a case where a new field device is introduced or the field device is replaced with another field device.

With the field communication management apparatus according to the embodiment of the invention, a pair of configuration information segments are consolidated by the function of the gateway 3 so that individual configuration information segments are automatically set in the field device 1 and the gateway 3, respectively. Accordingly, it is sufficient for the process engineer to prepare download information which bundled the configuration information segments to be set in the field device 1 and the gateway 3 as a pair of information segments, thereby dispensing with an operation for downloading configuration information segment into the field device at a work site. Accordingly, it is not necessary for the process engineer to administrate conditions of connection between the field devices, the risk of forgetting about the setting of either one of devices is eliminated, and a burden, and an inexpedience at the time of the operation for setting can be reduced at a large extent.

Further, step S3, and onwards, shown in FIG. 2, can be executed independently from an operation for preparing the download information by use of the management terminal device 4, or an operation for downloading the download information into the gateway 3 (step S1 to step S2). Accordingly, it is possible to prepare the download information beforehand, or to download the download information into the gateway 3, irrespective of timing when a field device is added, or replaced. For example, the download information as prepared can be kept stored in the storage 31a, and processing as shown, in step S3, and onwards, can be executed when a field device is actually introduced to a work site.

Further, since the communication limiting unit prohibits communications by the field device for a period before the individual information segments are set in the field device and the gateway 3, respectively, by the setting unit, so that an inexpedience such as abnormal communication caused by an unstable setting state during the setting of the configuration information segments can be avoided.

Meanwhile, even in a case where the operation procedure shown in FIG. 2 is proceeded without connection of the field device 1 with a wireless environment, at the time when the request for connection with the relevant field device 1 is made, the operation is transferred to step S6 to step S8, so that even in such a case, an inexpedience caused by the unstable setting state can be avoided.

Figure 3:
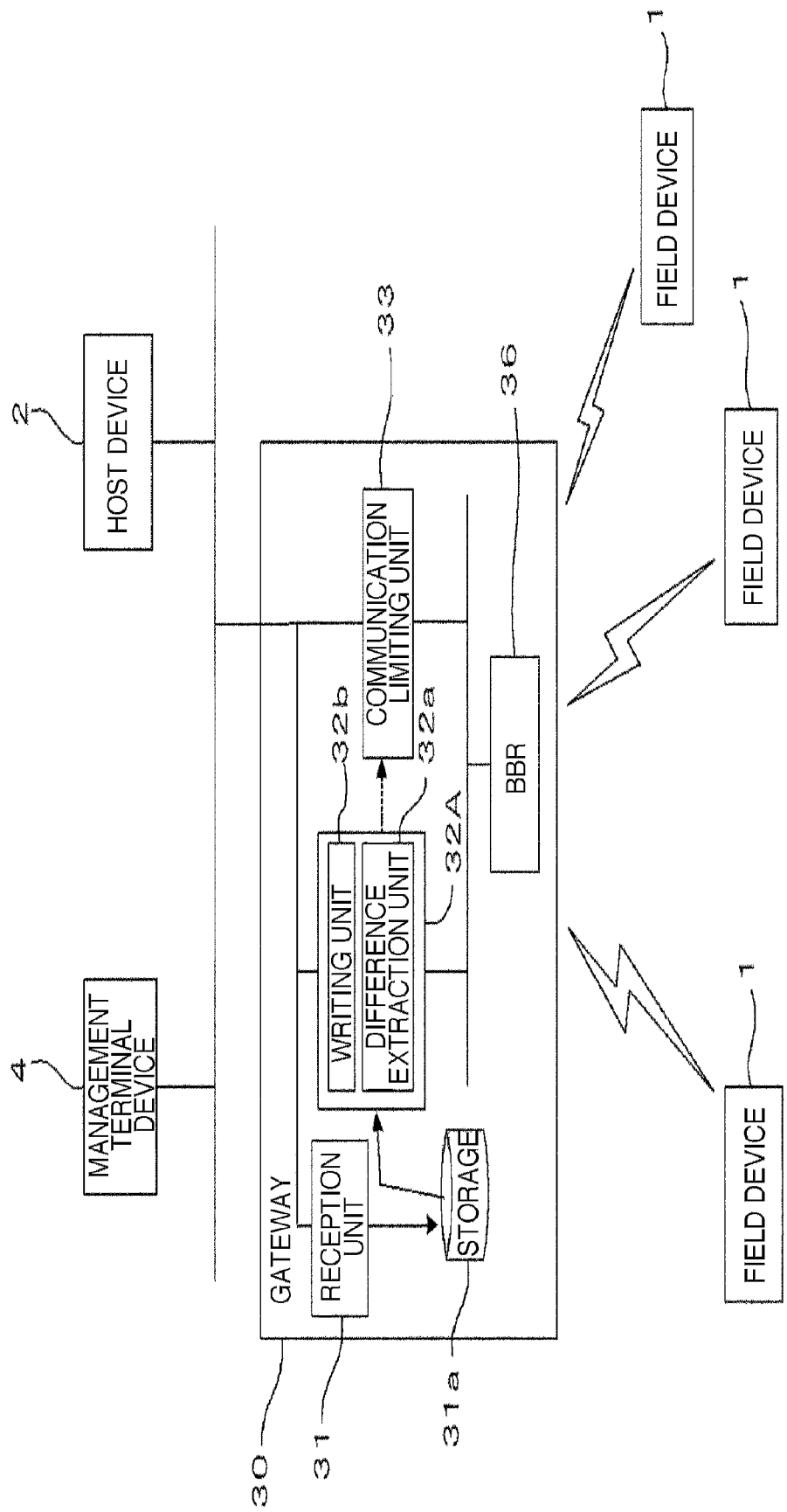
FIG. 3 is a block diagram showing a structure of a field communication management apparatus according to an embodiment 2.

FIG. 3 is a block diagram showing a structure of a field communication management apparatus according to another embodiment (Example 2).

As shown in FIG. 3, field devices 1, 1, ... provided with a wireless communication function are disposed in a plant, and these field device are connected to a host device 2 via a gateway 30. For example, a measured value obtained by the field device 1 is transmitted, for example, from the field device 1 to the host device 2 via the gateway 30, and an operation value is transmitted from the host device 2 to the field device 1. At a point in time, the field device 1 and the gateway 30 implement wireless communication by a Publish/Subscribe system in conformity with the ISA100.11a conforming to a field wireless communication standard. As shown in FIG. 3, a BBR (Back Bone Router) 36 for implementing wireless communication between the gateway 30 serving as "Gateway" and the field device 1 serving as "Device" is provided in the gateway 30.

As shown in FIG. 3, the gateway 30 comprises a reception unit 31 for receiving download information, a setting unit 32A for setting configuration information segments contained in the download information that is received by the reception unit 31 in the corresponding field device 1 and the gateway 30 itself, respectively, and a communication limiting unit 33 for prohibiting communication between the field device 1 and the host device for a period before the configuration information segments are set in the field device 1 and the gateway 30 itself, respectively, by the setting unit 32A.

Further, as shown in FIG. 3, the setting unit 32A comprises a difference extraction unit 32a for extracting a difference between the configuration information segments set in the relevant communication device and the information set in the field device 1, and a writing unit 32b for writing information in the field device 1 such that the difference extracted by the difference extraction unit 32a is eliminated.

The configuration information segments necessary for the foregoing wireless communication are preset in the field device 1 and the gateway 30, respectively. The configuration information segments contain ID of a device (identifier EUI64) as the other party of communication, a password set in the device, information for specifying the contents of communication, and a communication cycle, and the configuration information segments set in the relevant field device 1, and the gateway 30, respectively, are treated as a pair of information segments, the field device 1, and the gateway 30, being in communication with each other. Besides, the configuration information segments contain a device tag of the relevant device, alert information, control data information (range information, a threshold for defining whether or not it is alarm, and so forth). These respective information segments are caused to correspond to the respective identifiers EUI64, thereby being caused to correspond to the individual field devices 1.

The configuration information segment to be set in the gateway 30 is prepared by a process engineer by use of a configuration tool mounted in a management terminal device 4 shown in FIG. 3. Upon preparation of the configuration information segment to be set in the gateway 30, the process engineer prepares download information containing this configuration information segments. The download information is downloaded into the gateway 30. The reception unit 31 receives downloading of the download information and stores the download information in the storage 31a. The setting unit 32A acquires the configuration information segment to be set in the gateway 30 from the download information stored in the storage 31a, and sets the configuration information segment in the gateway 30.

Figure 4:
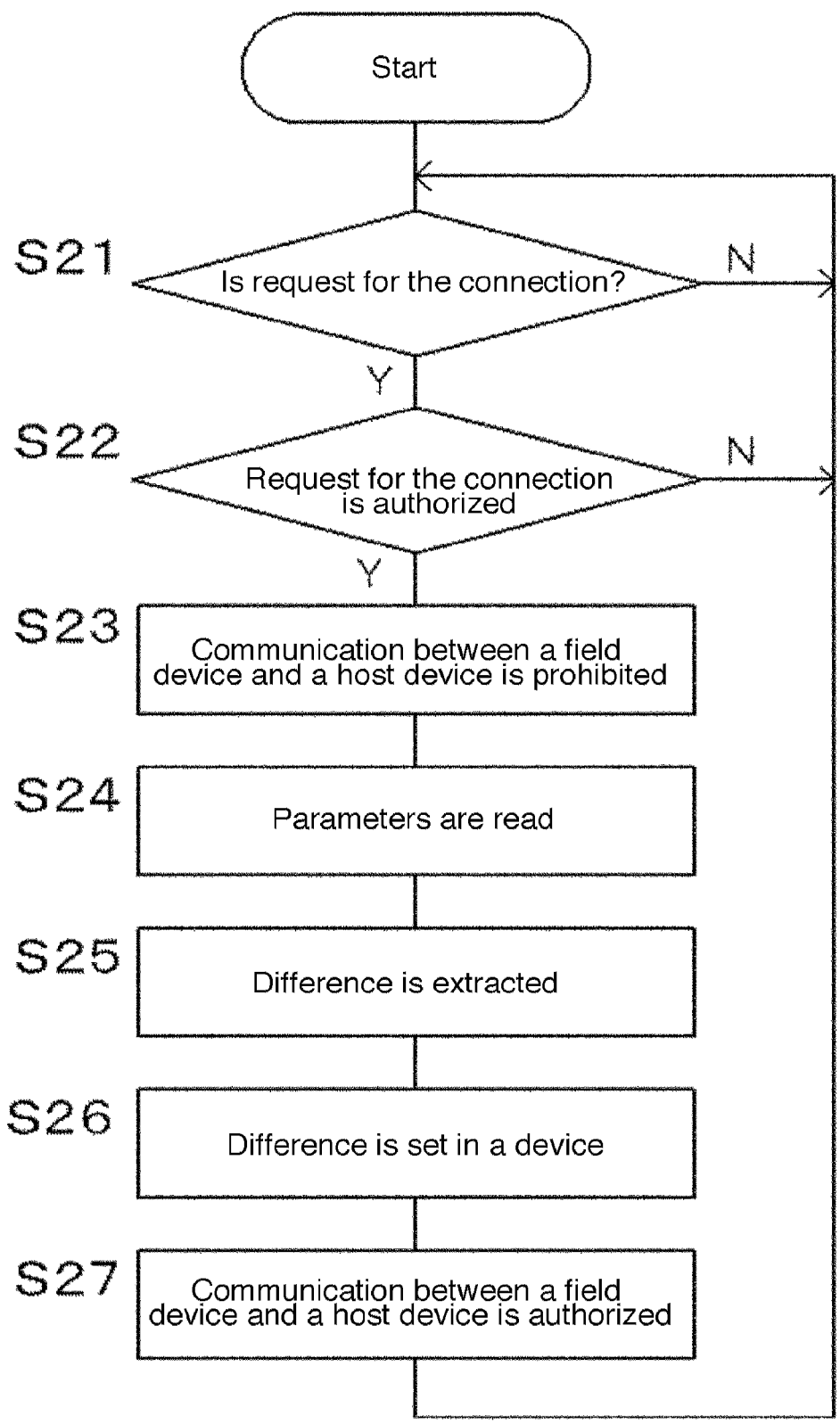
FIG. 4 is a flow chart showing an operation of the gateway when configuration information segments are set in the field device.

FIG. 4 is a flow chart showing an operation of the gateway when the request for connection with a wireless network is made.

In step S21 shown in FIG. 4, an operation waits for confirmation on whether or not the request for connection with the wireless network is made, and proceeds to step S22 upon obtaining the confirmation.

In step S22, it is decided as to whether or not connection to the relevant field device 1 with which the request for connection was made is authorized, and if the decision is affirmed, the operation proceeds to step S23, while if the decision is denied, the operation reverts to step S21. In step S22, an EUI64, a network ID, and a Join Key, which are transmitted from the relevant field device 1, respectively, are compared with the configuration information segments on the relevant field device 1, thereby deciding as to whether or not connection is authorized.

In step S23, the communication limiting unit 33 prohibits access of data from host devices including the host device 2 to the field device 1 which is a target for setting the configuration information.

Then, in step S24, the difference extraction unit 32a reads present parameters from the relevant field device 1 via the wireless network, and compares the parameters with the configuration information segment on the field device 1 set in the gateway 30, and extracts the difference therebetween.

Then, in step S25, the writing unit 32b prepares data such as parameters and so forth corresponding to the extracted difference in step S24 based on the configuration information segments on the relevant field device 1 set in the gateway 30, and writes the data in the relevant field device 1 by transmitting it via the wireless network. By so doing, the data (parameters and so forth) set in the relevant field device 1 are rewritten so as to conform to the configuration information segment on the relevant field device 1 set in the gateway 30.

Next, in step S27, a state of prohibition of communication by the communication limiting unit 33 is released and access of data from host devices including the host device 2 to the field device 1 is authorized, then the operation reverts to step S21. As a result, the field device 1 starts to execute data transmission/reception between itself and the host device via the gateway 30.

Thus, with the field communication management apparatus according to the present embodiment, when the field device is connected to the wireless network, a difference between the information segment set in the gateway 3 and the information segment set in the relevant field device is extracted, and only the difference therebetween is written in the field device via online. Accordingly, if the configuration information segment has already been set in the gateway 3 upon introduction or replacement of a device, an operation at a work site will be completed simply by installation of the device in a plant, so that the operation for installing the device can be separated from the setting of engineering data. That is, prior engineering for setting configuration information segment in a field device will not be required before connecting the field device to the wireless network, so that it is possible to substantially shorten operation time for replacement of the device, and to prevent an error in the setting of the configuration information segment in the field device. Further, in case that an error occurs in the setting of the configuration information segment in the field device for some reason, such data as set is automatically corrected, or updated.

Since only the difference between the information segment set in the gateway 30 and the information segment set in the relevant field device is extracted is written in the field device and data that is preset in the relevant field device is not updated, necessary communication time is shortened compared with a case where all data are written, thereby shortening time necessary for setting data in the field device. Particularly, since the transfer speed of data is limited in wireless communication, there develops a large effect to shorten time necessary for the setting of data.

From the standpoint of the individual parameters set in the field devices, the following advantageous effects can be gained.

(1) It is possible to prevent an error in setting a device tag in the respective field devices.
(2) Since a setting operation for alert information is completed simply by setting the same in the gateway 30, the alert information, together with a system application, can be managed in one operation.
(3) Since communication of control-data information is prohibited before completion of setting of the same in a field device, even if there occurs an error in setting thereof in the field device, it is possible to prevent transmission of erroneous control-data due to an error made in the setting before the error is corrected.

According to the invention, information segment to be set in the field device is not limited to the parameters set forth above, and can target every parameters relating to the operation of the field device and communication. Further, the invention can be applied to "All-in-one-Gateway" integrating the constituents of "Gateway", "System Manager" "Security" and "BBR", and also applied to individual constituents, i.e. "All-in-one-Gateway" or a constituent from which a part of the constituents are separated.

With the field communications managing apparatus, the individual information segments making up the pair of the information segments are set in the field device and the communication device, respectively, and the communications by the field device are restricted for the period before the individual information segments are set in the field device and the communication device, respectively, so that the configuration information can be set with certainty without causing a burden, and an inexpedience at the time of the operation for setting.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A field communications managing apparatus for handling configuration information necessary for communication between a field device and a communication device, the configuration information being a pair of information segments to be set in the field device and the communication device, respectively, said field communications managing apparatus comprising:
    a setting unit for setting both individual information segments of the pair of the information segments, in both the field device and the communication device, respectively; and
    a communication limiting unit for limiting communications by the field device for a period before the individual information segments are set in the field device and the communication device, respectively, by the setting unit,
    wherein the setting unit comprises:
        a difference extraction unit for extracting a difference between the information segment of the pair of the information segments, set in the communication device, and the information segment of the pair of the information segments, set in the field device; and
        a writing unit for writing information in the field device such that the difference extracted by the difference extraction unit is eliminated.

2. The field communications managing apparatus according to claim 1, wherein the setting unit sets the information segment in the field device by use of the difference extraction unit and the writing unit when the field device joins a communication network.

3. The field communications managing apparatus according to claim 1, further comprises a reception unit for receiving the pair of the information segments, and the setting unit sets individual information segments of the pair of the information segments, received by the reception unit, in the field device and the communication device, respectively.

4. The field communications managing apparatus according to claim 1, wherein the communication device is a device for relaying communication between the field device and a host device, and the communication limiting unit prohibits communication between the field device and the host device.

5. The field communications managing apparatus according to claim 1, wherein the communication between the field device and the communication device is wireless communication.

6. The field communications managing apparatus according to claim 1, wherein the pair of the information segments contain information for specifying the other party of communication.

7. The field communications managing apparatus according to claim 1, wherein the pair of the information segments contain information for specifying contents of communication.

8. The field communications managing apparatus according to claim 1, wherein the pair of the information segments contain information for specifying a communication cycle.

* * * * *